United States Patent Office 3,513,012
Patented May 19, 1970

3,513,012
MULTILAYER COATING PROCESS
Marcel A. R. Point, Grenoble, France, assignor to SAMES, Societe Anonyme de Machines Electrostatiques, Grenoble, France, a French joint-stock company
No Drawing. Continuation-in-part of application Ser. No. 355,906, Mar. 30, 1964, which is a continuation-in-part of application Ser. No. 299,786, Aug. 5, 1963. This application Dec. 19, 1968, Ser. No. 785,352
Claims priority, application France, Mar. 28, 1963, 929,621
Int. Cl. B05b 5/02; B44d 1/16, 1/08
U.S. Cl. 117—17                                10 Claims

ABSTRACT OF THE DISCLOSURE

A process for coating an article with substances which are convertible by heat treatment into two or more continuous but separate solid layers. The substance forming the second layer comprises electrically charged powder particles which are electrostatically deposited on the article while the substance forming the first layer is in an unconverted condition, the electrostatic attraction between the particles preventing substantial interpenetration between the layers. The coated article is exposed to a heat treating step for simultaneously converting both substances, including the fusing of the particles into a continuous solid layer.

CROSS-REFERENCES TO RELATED APPLICATIONS

This application is a continuation-in-part of copending U.S. application Ser. No. 355,906, filed Mar. 30, 1964, now abandoned, which latter application is a continuation-in-part of U.S. application Ser. No. 299,786, filed Aug. 5, 1963, now Pat. No. 3,323,934, granted June 6, 1967.

BACKGROUND OF THE INVENTION

This invention relates to a method for surface coating articles for purposes of protection against physical and chemical agents as well as for enhancing the appearance of the articles.

A great many different types of coatings are used in present day manufacturing techniques, including paints, natural varnishes, plastic coatings, powder metal coatings, enamels, etc. For the most part, however, the application of each of these coatings to the surface of an article includes the steps of depositing the coating substance to the surface in the form of a layer of liquid or a solid powder and then heating or otherwise curing the coated surface to convert the substance into a solid continuous layer or film firmly bonded thereto. This last step, herein termed a curing or heat treating step, assumes a variety of forms and is primarily dependent on the physical and chemical characteristics of the coating substance. Thus, in the case of a liquid paint, for example, the final step is a simple drying step involving exposure of the coated article to air at ambient or slightly elevated temperature. In the case of many types of liquid varnishes, lacquer, thermosetting resins, etc., the final treatment is in the nature of a setting, i.e., polymerization, involving the application of heat to a temperature which usually is below about 200° C. For most enamelling operations and the like, the final heat treatment is a firing step at a comparatively higher temperature, generally above 400° C., to produce a vitrification of the coating substance.

Many types of coating processes involve the deposition of two or more successive layers of either similar or different coating substances over the surfaces of the article. Thus, regardless of the characteristics of the top or outer coating layer to be applied, several coating processes require the provision of a sublayer or primer coat which serves as a base for bonding the overlying coating to the surface.

In conventional surface coating processes involving the application of two or more layers of coating substance to the article, it has heretofore been necessary to expose the article to a curing or heat treating step following the deposition of each layer and prior to the deposition of the next layer. In the absence of such multiple curing steps, an undesirable mixing and possible chemical reaction between adjacent layers takes place, and the layers to not properly solidify to form the type of coating intended.

The need for a separate curing or heat treating step for each layer of a multilayer coating has produced serious complications in the performance of coating processes of the type previously employed. Thus, especially in the case of a large scale coating plant, for example, in which the articles to be coated are continuously advanced through a series of successive processing stations, it often has been necessary to provide a heat treating furnace or oven following each coating (e.g., dipping or spraying) step of the series, thereby substantially increasing expenditure in equipment, consumed energy, manpower and processing time.

SUMMARY OF THE INVENTION

It is an object of this invention to provide an improved multilayer coating process through the elimination of some and preferably all but the ultimate heat treating or curing step.

In attaining this object, the invention makes use of electrostatic coating techniques. As will be understood, such techniques employ particles of finely divided coating substance, such as liquid droplets or solid powder particles, which are carried to a high electrical potential (e.g., one hundred kilovolts) as they are discharged in a cloud adjacent the work to be coated. The work is maintained at a potential different from that of the particles and customarily is at ground potential. The particles are guided along the lines of force of the electric field created between the particle source and the article being coated. The individual particles settle over the surfaces of the article with a high degree of uniformity and with little loss to surrounding surfaces, and the particles remain bonded to the coated surfaces by electrostatic attraction. Electrostatic coating has gained wide acceptance in recent years owing to its considerable advantages over many types of more conventional coating methods, including improved uniformity in coating thickness, improved bond and reduced loss of material.

According to several important embodiments of the invention, there is provided a process for coating articles which comprises the steps of applying a sublayer of coating material to the surface to be coated, and then applying a further layer of coating material while the sublayer is in an uncured condition. At least one of the layer's preferably the outer layer, is applied by the electrostatic deposition of electrically charged particles on the article. The thus coated article is subjected to a final curing step which simultaneously bonds both the sublayer and the further layer in position.

DESCRIPTION OF THE PREFERRED EMBODIMENTS

The sublayer of coating material is deposited on the article in either its liquid or solid state and is applied by conventional coating procedures, such as brushing, dipping or spraying, for example, or by an electrostatic coating process. In some advantageous arrangements, the process includes the depositing of more than two coating layers on the article. Particularly good results are obtained in cases in which the outermost layer and preferably at least one of the subjacent layers are applied to the article in the form of finely divided powder particles which are electrostatically deposited thereon.

In understanding some of the advantages of the invention over prior multilayer coating processes and the reasons why the intermediate curing or heat treatments of such prior processes may be eliminated, several factors are involved. For one thing, owing to the strong electrostatic bond between the individual particles of the electrostatically deposited layer, this layer exhibits improved cohesion which prevents or greatly reduces its tendency to mix or interact with the other layer, even during the time the latter layer is in its uncured state. As a result the curing of the sublayer may be delayed until after the outer layer has been applied, and the sublayer is cured simultaneously with the outer layer in a common heat treating step.

Another important factor is that the electrostatic technique greatly facilitates the application of the coating material in the form of solid pulverulent particles, whereas prior techniques often necessitated the application of the material in its liquid state to enable the realization of the requisite degree of uniformity and smoothness. Solid coating particles inherently exhibit less tendency to run and mingle with an adjacent uncured layer than does a liquid.

Furthermore, in cases in which electrostatic deposition techniques are employed there is no need for preconditioning the articles to be coated by the application of heat, whereas deposition in the absence of an electric field often requires that the surface to be coated be heated to a substantial temperature to secure an initial bond. Because of the absence of such preliminary heating, the possibility of undesirable interactions between the newly deposited layer and the underlying uncured sublayer are further reduced.

Various types of electrostatic spraying equipment may be successfully employed in performing the process of the invention. In several advantageous arrangements, one or more electrostatic projection guns, illustratively of the type disclosed in U.S. Pat. No. 3,323,934 referred to above, are used to apply the final coating layer. In other cases, the equipment includes an electrically charged fluidized bath of the coating powder. Representative coating equipment of this latter type is disclosed, for example, in U.S. Pat. No. 3,248,253, granted Apr. 26, 1966.

In cases in which each successive coating layer is applied to the article by an electrostatic precipitation step, coatings of substantially increased thickness are achieved by electrostatically charging the applied particles in each step subsequent to the first step to a D.C. potential of a polarity which is opposite to that of the charge appearing on the article at the start of the subsequent step. As more fully disclosed in the aforementioned U.S. Pat. No. 3,323,934, the particles applied during the subsequent step are attracted by the oppositely charged article such that any tendency toward the establishment of a counterfield repelling further particles is ineffective to adversely affect the thickness of the applied coating. The coating is thus built up to a combined depth far exceeding the depths heretofore attainable.

Although a wide variety of coating materials may be used for the sublayer and the top layer, particularly good results are obtained in cases in which the material for at least one of the layers exhibits comparatively high insulation properties, when compared with the electrical conductivity of the article being coated. For applying coatings of various metallic materials, such as aluminum powder, for example, to steel or other electrically conductive articles, sufficient oxidation of the powder takes place so that the resistivity of the coating is higher than that of the article. In addition, the material for the sublayer advantageously has a high resistivity which should be at least about $10^5$ ohm-centimeters particularly in cases in which a conductive top layer is to be applied. The resistivity of the sublayer serves to insulate the top layer from the article being coated and prevents substantial dissipation of the electrostatic charge on the individual particles comprising the top layer. With this arrangement, the individual particles are affirmatively maintained in position by electrostatic adhesion, and the possibility of substantial current flow between the particles and the article is maintained at a minimum.

In several advantageous embodiments, the coating which forms the sublayer comprises a polymerizable material, and the top layer is in the form of electrically charged polymerizable powder particles which are electrostatically deposited on the article. The ensuing curing step serves to simultaneously polymerize both of the layers to form an extremely smooth and uniform coating.

Representative coating materials that have exhibited particular utility for the electrostatically applied top layer include several of the metallic powders, including aluminum and bronze, a wide variety of thermoplastic resins, such as polyvinyl chloride, polyethylene, polypropylene, nylon or other polyamide, the cellulosics, acrylics, etc., various thermosetting resins, e.g., the epoxies, several phenolic type resins and many of the silicones, for example, and various inorganic powders. Examples of suitable powders of this latter class include talc, silica, feldspar, borax, magnesium carbonate, sodium nitrate and phosphors.

Some of the materials that have been found suitable for the sublayer include epoxy resin, the acrylics, the alkyd resins, such as glycerophthalic resin, for example, various inorganic enamel powders, e.g., silica, feldspar, magnesium carbonate, sodium nitrate, talc, borax, etc., and natural varnish compositions. Several of the additional materials identified above for use as the top layer also may be employed with good effect as the sublayer.

After the sublayer has been applied to the article, and while the sublayer is still in its unconverted condition, the powder particles of the top layer are applied through the use of electrostatic techniques. The thus coated article is then heated to a temperature and for a time sufficient to simultaneously convert both layers to form continuous solid layers, thereby forming a smooth and uniform coating on the article. In cases in which the top layer is of metallic powder particles, the heating step is effective to fuse the particles to produce the coating. As used herein and in the appended claims, the terms "fuse," "fusing," etc., are employed in a manner similar to sintering" to describe the softening and agglomeration of the particles through molecular diffusion. To accomplish such fusion, the particles are heated to the fusion temperature of the material, which customarily is less than the melting temperature, for at least about two minutes or more depending upon the thickness of the desired coating.

In order to more clearly describe the nature of the present invention, the following examples illustrating the invention are disclosed. It should be understood, however, that this is done solely by way of example and is intended neither to delineate the scope of the invention nor limit the ambit of the appended claims.

EXAMPLE I

To provide a plastic protective and decorative coating on sheet steel, aluminum and copper articles including tubular chair frames, washing machine cover plates and ornamental wall panels, a sublayer comprising a dilute solution of an acrylic composition sold as "Grisocoll," a trade name of Knapsack, Griesheim A.G., of Knapsack, Germany, was first sprayed over the articles and served as a wash primer. Other suitable compositions compatible with polyvinyl chloride also are useful for this purpose. The subcoated articles were then passed through an electrostatic coating station at which a finely divided powder of polyvinyl chloride was sprayed thereon in an air suspension by an electrostatic spray gun. At the time the articles reached the electrostatic coating station, the wash primer sublayer was in an uncured condition and was substantially wet. Following the electrostatic application of the polyvinyl chloride top layer to the articles, the articles were directed through an oven in which they were maintained at a temperature of approximately 200° C. for a length of time which averaged about five minutes. It was found that as a result of this final heat treating step the wash primer sublayer was fully dried and set, and the top layer had polymerized to provide a uniform, tightly adhering and flawless coating of polyvinyl chloride.

EXAMPLE II

Steel containers to be used for carrying butane gas were coated by first applying a sublayer of epoxy resin powder at an electrostatic spray gun station. The containers were then continuously passed through a further electrostatic coating station while the epoxy resin was in an uncured condition. At this latter station, finely divided aluminum powder was electrostatically applied to the containers to form a finish coat. The thus coated containers were then led through an oven in which they were maintained at a temperature of 200° C. for about fifteen minutes. This procedure resulted in the sintering of the aluminum powder to provide an extremely satisfactory fused aluminum coating.

Refrigerator cabinets and ornamental wall panels of steel, aluminum and other metals were similarly treated with excellent results.

A generally similar procedure has been succssfully used to apply polyamide outer coatings.

EXAMPLE III

Cast iron and sheet steel articles including bathtubs and kitchen stoves were enamelled by first applying a liquid enamel base layer comprising a water suspension of fine vitrifiable inorganic powder substances such as silica, feldspar, magnesium carbonate, sodium nitrate, etc. The base layer was applied through the use of conventional spraying techniques. While the enamel sublayer was still partly wet, the articles were passed through an electrostatic spray coating station at which an enamel powder finishing composition was deposited thereon from an electrostatic spray gun. The enamel powder comprised a mixture of finely ground vitrifiable substances including silica, feldspar, borax, metal oxide pigments, urea and soda aluminate. The coated articles were then introduced into an oven where they were fired at a high temperature of about 840° C. for fifteen minutes. The heat treatment served to evaporate the water from the base layer and to simultaneously fire or vitrify both enamel layers to provide a strong, smooth enamel coating over the surfaces of the articles.

In a desirable variation of this procedure, the liquid base layer was replaced by a solid powder base layer of similar composition but lacking the aqueous suspending medium. The base layer was applied by electrostatic projection with even better results.

It will be noted that the intermediate firing step heretofore considered to be necessary following the application of the enamel base layer has been eliminated. This intermediate step previously was conducted at a temperature comparable to the temperature used in the final firing operation, and its elimination comprises an important economic advantage.

EXAMPLE IV

Automotive body components of steel and aluminum sheet construction were first subcoated with a clear epoxy resin composition. While the subcoat was in its uncured condition, a top coat of dry aluminum powder was applied by electrostatic projection. The electrostatically coated parts were then passed through an oven at 200° C., where they remained for about thirty minutes to cure the resin and bond the powder aluminum in position.

For some of the parts, bronze was substituted for the aluminum as the powder metal top layer. In all cases uniform, firmly adherent metal coatings were obtained over the exposed surfaces.

EXAMPLE V

In a variation of the procedure used in Example IV, a clear liquid glycerophthalic varnish resin composition was used to form the sublayer in place of the epoxy resin. Both the sublayer and the top layer were applied to the articles electrostatically.

Various other varnish compositions also have been successfully employed to form the sublayer in accordance with the procedure described in Examples IV and V. The term "varnish," as used herein and in the appended claims, refers to the class of compounds conventionally known in the art as varnishes and is not intended to encompass the epoxies, enamels or similar materials.

EXAMPLE VI

Electrically conductive articles at ground potential were coated with a sublayer or wash primer in the form of an epoxy resin suspension. While the sublayer was still in an unconverted condition, a top layer of nylon 11 (prepared from an omega-ameno-undecanoic acid which itself comes from castor oil) was electrostatically applied in powder form. The thus coated articles were then passed through a drying oven at a temperature of 230° C., and the articles were held in the oven for various times between two minutes to eight minutes. Upon the completion of the heat treatment, smooth and uniform coatings were observed on the articles in all instances.

EXAMPLE VII

The procedure used in Example VI was repeated except that glycerophthalic resin was employed for the sublayer in place of epoxy resin. The resistivity of the glycerophthalic resin ranged between $10^7$ and $10^8$ ohm-centimeters. In some cases the nylon 11 top layer was electrostatically applied immediately after the application of the sublayer, while on other articles the top layer was electrostatically applied a few minutes after the sublayer. In all instances the sublayer was in an unconverted condition at the time of application of the top layer. The articles withdrawn from the oven following the heat treating step exhibited uniform and firmly adherent coatings.

The coating process employed in the foregoing examples is characterized by an arrangement in which at least the top or outermost layer comprises solid pulverulent particles which are deposited in an electrically charged state by electrostatic coating techniques. The curing step of the method is used only after the application of the final coating and serves to simultaneously cure both the top layer and at least one underlying layer. Although in each of the examples only two coating layers were specifically discussed, it of course will be apparent that more than two layers also may be applied with good effect.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In an article coating process, the steps of applying to the article a sublayer selected from the group consisting of epoxy resin powder, liquid alkyd resin, enamel powder, liquid varnish and vitrifiable powder, thereafter electrostatically applying an outer layer of electrically charged powder particles to said article while the sublayer is in the same physical state as that at the time it was applied, to provide an electrostatic bond between the individual powder particles and thereby prevent substantial interpenetration with respect to said sublayer, the relationship between the compositions of said sublayer and said powder particles being such that, upon the heating of said sublayer and said particles to the same temperature and then cooling the same, both said sublayer and said particles form continuous solid layers without vaporization or sublimation, and exposing the thus coated article to heat at said temperature and for a time sufficient to convert both said sublayer and said powder particles into continuous solid layers in a single heat treating step, to form a smooth and uniform outer coating on said article.

2. In an article coating process as set forth in claim 1, said sublayer comprising a liquid varnish composition, and said powder particles being selected from the group consisting of aluminum, bronze and nylon.

3. In an article coating process as set forth in claim 1, wherein each of said layers comprises a vitrifiable powder composition, and said heat treating step comprises a high-temperature firing step.

4. In an article coating process, the steps of applying to the article a sublayer convertible by heat into a continuous solid layer, said sublayer being selected from the group consisting of epoxy resin powder, liquid alkyd resin, enamel powder and liquid varnish, electrostatically applying an outer layer of electrically charged powder particles to said article while the sublayer is in an unconverted condition, said powder particles being selected from the group consisting of aluminum, bronze, enamel, polyvinyl chloride and nylon, to provide an electrostatic bond between the individual powder particles and thereby prevent substantial interpenetration with respect to said sublayer, the relationship between the compositions of said sublayer and said powder particles being such that, upon the heating of said sublayer and said particles to the same temperature and then cooling the same, both said sublayer and said particles form continuous solid layers without vaporization or sublimation, and exposing the thus coated article to heat at said temperature and for a time sufficient to convert both said sublayer and said powder particles into continuous solid layers in a single heat treating step, to form a smooth and uniform outer coating on said article.

5. In an article coating process as set forth in claim 4, wherein said sublayer comprises epoxy resin.

6. In an article coating process, the steps of applying to the article a sublayer convertible by heat into a continuous solid layer, said sublayer having a resistivity of at least about $10^5$ ohm-centimeters and being selected from the group consisting of epoxy resin powder, liquid alkyd resin, enamel powder, liquid varnish and vitrifiable powder, thereafter electrostatically applying an outer layer of electrically charged metallic powder particles to said article while the sublayer is in an unconverted condition, to provide an electrostatic bond between the individual powder particles and thereby prevent substantial interpenetration with respect to said sublayer, the relationship between the compositions of said sublayer and said powder particles being such that, upon the heating of said sublayer and said particles to the same temperature and then cooling the same, both said sublayer and said particles form continuous solid layers without vaporization or sublimation, and exposing the thus coated article to heat at said temperature and for a time sufficient to convert said sublayer and fuse said metal powder particles into continuous solid layers in a single heat treating step, to form a smooth and uniform outer coating on said article.

7. In an article coating process, the steps of applying to the article a sublayer convertible by heat into a first continuous solid layer, said sublayer being selected from the group consisting of the epoxy resins and the alkyd resins, electrostatically applying an outer layer of electrically charged nylon powder particles to said article while the sublayer is in an unconverted condition, the relationship between the compositions of said sublayer and said powder particles being such that, upon the heating of said sublayer and said particles to the same temperature and then cooling the same, both said sublayer and said particles form continuous solid layers without vaporization or sublimation, and exposing the thus coated article to heat at said temperature and for a time sufficient to convert both said sublayer and said powder particles into said continuous solid layers in a single heat treating step, to form a smooth and uniform outer coating on said article.

8. In an article coating process as set forth in claim 7, said sublayer comprising glycerophthalic resin.

9. In an article coating process as set forth in claim 7, said sublayer having a resistivity of between about $10^7$ and $10^8$ ohm-centimeters.

10. In an article coating process, the steps of applying to the article a sublayer convertible by heat into a continuous solid layer, said sublayer being selected from the group consisting of epoxy resin, enamel and varnish, electrostatically applying an outer layer of electrically charged metallic powder particles to said article while said sublayer is in an unconverted condition, said powder particles being selected from the group consisting of aluminum and bronze, the relationship between the compositions of said sublayer and said powder particles being such that, upon the heating of said sublayer and said particles to the same temperature and then cooling the same, both said sublayer and said particles form continuous solid layers without vaporization or sublimation, and exposing the coated article to heat at the fusion temperature of said particles for at least about two minutes to convert said sublayer and fuse said particles into continuous solid layers in a single heat treating step, to form a smooth and uniform outer coating on said article.

References Cited

UNITED STATES PATENTS

| | | | |
|---|---|---|---|
| 3,140,195 | 7/1964 | Nagel | 117—75 X |
| 3,144,344 | 8/1964 | Umhoefer | 117—70 X |
| 3,194,675 | 7/1965 | Carter et al. | 117—29 |
| 3,207,358 | 9/1965 | Fliss | 220—64 |
| 3,000,752 | 9/1961 | Jackson | 117—17 |
| 1,473,903 | 11/1923 | Denk | 117—23 |
| 2,087,260 | 7/1937 | Miller | 117—17 |
| 2,784,630 | 3/1957 | Koprow et al. | 117—33 |
| 2,955,055 | 10/1960 | Souder et al. | 117—75 |
| 3,006,780 | 10/1961 | Schaffer | 117—119.6 X |
| 3,008,847 | 11/1961 | La Berge | 117—75 X |
| 3,029,160 | 4/1962 | Van Der Beck | 117—17 X |
| 3,055,762 | 9/1962 | Hoffman | 117—70 X |
| 3,058,443 | 10/1962 | Paton | 117—17 |
| 3,075,222 | 1/1963 | Miller | 117—17 X |
| 3,082,138 | 3/1963 | Hjelt | 117—17 X |

OTHER REFERENCES

Skeist: Epoxy Resins, Rheinhold Publishing Corp., pp. 180–184.

Burns, R. M.: "Protective Coatings for Metals," Rheinhold Publishing Corp., pp. 84–87 (1955).

Payne, Henry Fleming: "Organic Coating Technology," John Wiley & Sons, vol. I, pp. 269, 298, 299 (1954); vol. II, pp. 1194–1199 (1961).

WILLIAM D. MARTIN, Primary Examiner

E. J. CABIC, Assistant Examiner

U.S. Cl. X.R.

117—21, 22, 23, 29, 33, 70, 71, 75